Figure 1:
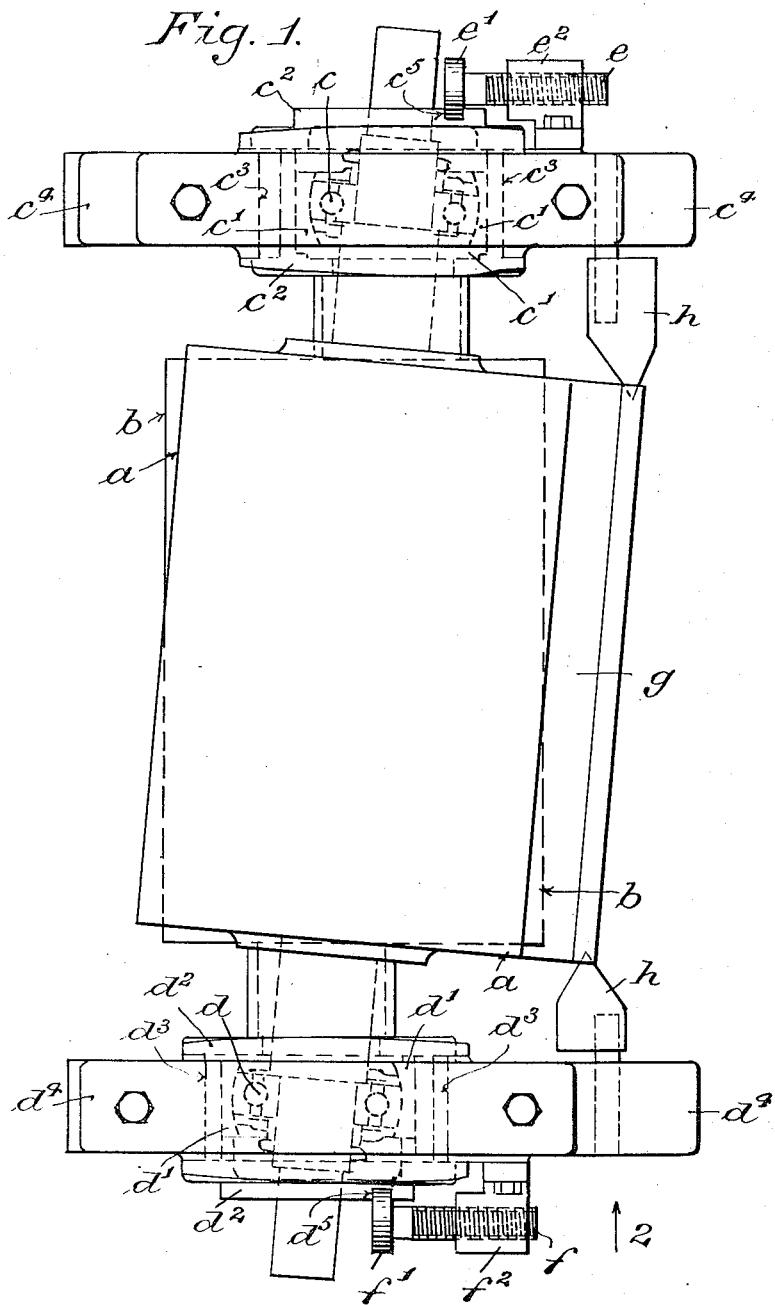

United States Patent Office 2,762,295
Patented Sept. 11, 1956

2,762,295

DISTRIBUTION OF PRESSURE BETWEEN A PAIR OF PRESSURE ROLLERS

André Varga, Toronto, Ontario, Canada, and Frank T. Stott, Rochdale, England, assignors to Carding Specialists (Canada), Limited, Toronto, Ontario, Canada Application October 30, 1951, Serial No. 253,855

Claims priority, application Great Britain November 1, 1950

7 Claims. (Cl. 100—158)

The invention relates to means for distributing evenly along their length the pressure exerted between a pair of co-operating pressure rollers, one or both of which has a load of predetermined amount applied to the ends of a shaft carrying it.

It is known that in an assembly of this kind the pressure load applied to the ends of the rollers causes them to have a tendency to bend longitudinally so that, in consequence, the effect of the pressure load is gradually reduced towards the centre of the length of the rollers, and may in fact become nil, whilst that towards the ends is at a maximum.

In order to counteract this bending tendency one or both of the rollers have been "cambered" or reduced in diameter towards the ends, so that in longitudinal section the surface of the roller is in the form of an arc of a circle of large diameter.

Thus, when load is applied, the resultant bending of the rollers causes surface contact to be provided along their full length, so that material passed between them is subjected to uniform pressure across its full width.

In order to obtain the desired result the amount of camber required has had to be calculated from the rigidity or known bending moment of the rollers, and from their length and diameter, but this calculation has only held good for one particular amount of loading pressure. Thus if a smaller load is applied than that for which the assembly has been designed the surfaces of the rollers will not be in contact towards the ends of the rollers. On the other hand, if the applied load is greater than that for which the camber has been calculated, the middle parts of the rollers will not be in contact and material passing between such parts will not be subjected to the required predetermined pressure.

It is an object of the present invention to provide an arrangement of pressure rollers in which, using cylindrical or uncambered rollers, it can be ensured that the rollers remain in contact throughout their entire length so long as the load applied between them remains constant.

A further object is to make provision whereby within limits the pressure load applied between the rollers may be varied and the surfaces of the rollers still remain in contact along their entire length.

The invention is characterised in that instead of the axes of two co-operating cylindrical pressure rollers being parallel, they are arranged to cross one another at a predetermined angle at the common central point in the length of the rollers. By thus arranging the roller axes there will be created, between the roller surfaces, a gap which increases gradually from the central point at which the rollers are in contact, towards their ends, and by appropriate determination of the angle at which the roller axes are crossed, a result will be obtained, when pressure load is applied, of providing contact along the entire length of at least one roller and along a line forming part of a helix to provide a result similar to that previously obtained by cambering one or both of a pair of rollers the axes of which are parallel to one another.

It is obvious, however, that an arrangement such as has just been described will only give the desired result with one given amount of pressure load. Provision is, therefore, preferably made for enabling the angle at which the axes of the rollers cross one another to be adjustable, and if desired provision may be made to correlate automatically the crossing angle of the roller axes to the amount of pressure load applied between the rollers. In practice, however, any such automatic correlation of crossing angle to pressure load is really unnecessary as will appear later.

Figure 2:
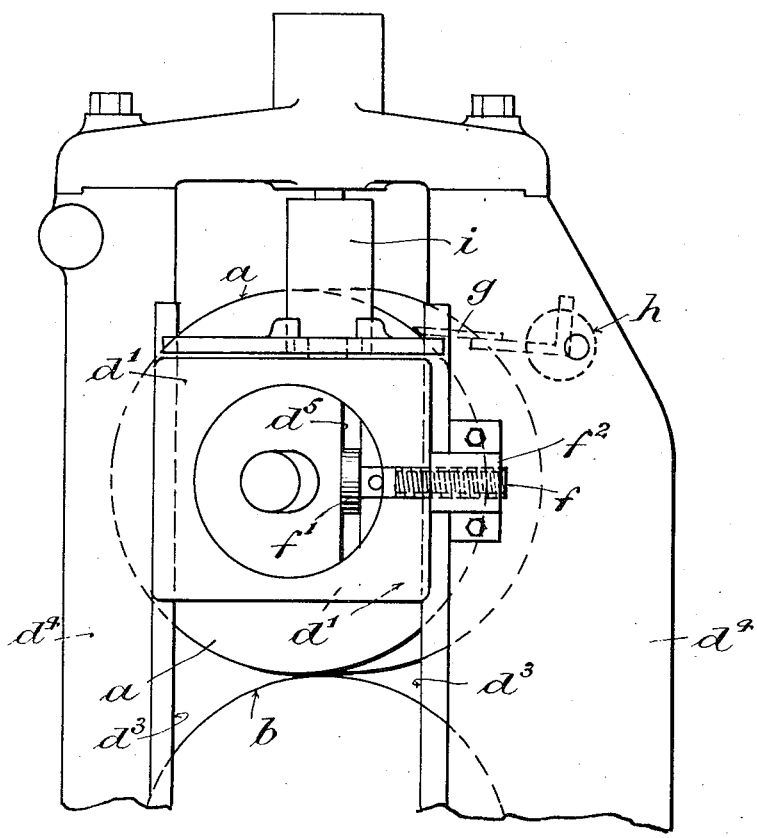

In the accompanying drawings to which reference will now be made, Fig. 1 is a plan view of one good, practicable embodiment of the invention; and Fig. 2 is an end view looking in the direction of the arrow 2 in Fig. 1.

Referring to the drawings, $a$ and $b$ represent respectively the upper and the lower of a pair of co-operating pressure rollers. The lower roller $b$ is journalled at its ends in suitable fixed bearings, not shown. The upper roller $a$ is journalled at its ends in respective self-aligning bearings $c$ and $d$ carried by respective bearing blocks $c'$ and $d'$. These blocks are movable vertically in slots $c^3$ and $d^3$ in fixed members $c^4$ and $d^4$, and they are located longitudinally by cover plates $c^2$ and $d^2$. Suitable means are provided to apply predetermineed downward load upon the blocks $c'$ and $d'$ in order to cause the desired pressure to be exerted between the upper and lower rollers.

In Fig. 2 of the drawings, the pressure-applying means are shown diagrammatically as consisting of hydraulic plungers such as $i$ disposed one above each bearing block.

The bearing blocks $c'$ and $d'$ are made suitably narrower than the slots in which they are accommodated and each of them has in its end a vertical slot $c^5$ or $d^5$ which is offset from the centre, as shown in Fig. 2. In each of these slots $c^5$ or $d^5$ there engages the head $e'$ or $f'$ of a micrometer screw $e$ or $f$ working in a threaded opening in a part $e^2$ or $f^2$ integral with or attached to the machine frame.

It will be apparent that, by appropriate adjustment of the screws $e$ and $f$, the axis of the upper roller $a$ can be made to occupy, within of course certain limits, any desired angular relation to that of the lower roller $b$. Thus the axes of the two rollers may be set parallel to one another, which position corresponds to that in which no pressure load or a pressure load insufficient to cause any tendency towards longitudinal bending of the rollers is applied, or the axes may be so set angularly relative to one another that on application of a certain pressure load to the ends of the roller $a$ the surface of the two rollers will be caused to contact truly from end to end along a line forming part of a helix.

A suitably calibrated scale or scales or other means may be provided to facilitate setting of the roller $a$ to the correct angular position called for by the particular pressure load it is desired to apply between the rollers.

We have described the upper roller of a pair of co-operating rollers as being adjustable angularly for the purpose specified. It will be appreciated that if preferred it may be the lower roller of a pair which is arranged to be adjustable angularly or both rollers may be arranged to be adjustable though in practice this will not be necessary.

It is usual to provide a scraper such as $g$ to act upon the surface of the upper roller $a$. To enable this scraper to be set accurately in relation to the roller when the angular position of such roller in relation to the roller $b$ is varied its ends are carried eccentrically in rotatable members $h, h$, so that by appropriate adjustment of said members the scraper can be set to occupy an angular position corresponding to that of the roller $a$.

In the claims which follow, reference is made to the initial bend of one of the rollers about the other roller. This initial bend is the bend which is made in one of the rollers, about the other roller, when the machine is set up for operation and just before the material which is to be pressed is fed between the rollers.

Having thus described our invention, what we claim as new and desire to secure by Letters Patent is:

1. Pressure roller apparatus comprising, in combination, support means; a first cylindrical roller mounted for rotation about its axis on said support means; a second cylindrical roller also mounted for rotation about its axis on said support means and having one end portion located on one side of said axis of said first roller and an opposite end portion located on the opposite side of said axis of said first roller; and resilient pressing means operatively connected to opposite ends of said second roller for pressing the same toward said first roller, said second roller having an initial bend of slight magnitude about said first roller, said pressing means causing said second roller to have said bend about said first roller and providing contact between said first and second rollers along the entire length of at least one of said rollers and along a line forming part of a helix.

2. Pressure roller apparatus comprising, in combination, support means; a first cylindrical roller mounted for rotation about its axis on said support means; a second cylindrical roller also mounted for rotation about its axis on said support means and having one half of its axis located on one side of said axis of said first roller and the other half of its axis located on the opposite side of said axis of said first roller; and yieldable pressing means operatively connected to opposite ends of said second roller for pressing the same toward said first roller, said second roller having an initial bend of slight magnitude about said first roller, said pressing means causing said second roller to have said bend about said first roller and providing contact between said first and second rollers along the entire length of at least one of said rollers and along a line forming part of a helix.

3. Pressure roller apparatus comprising, in combination, support means; a first cylindrical roller mounted for rotation about its axis on said support means; a second cylindrical roller also mounted for rotation about its axis on said support means and having one half of its axis located on one side of said axis of said first roller and the other half of its axis located on the opposite side of said axis of said first roller; yieldable pressing means operatively connected to opposite ends of said second roller for pressing the same toward said first roller, said second roller having an initial bend of slight magnitude about said first roller, said pressing means causing said second roller to have said bend about said first roller and providing contact between said first and second rollers along the entire length of at least one of said rollers and along a line forming part of a helix; and adjusting means operatively connected to said second roller for adjusting the inclination thereof with respect to said first roller, said adjusting means including a pair of bearing means respectively carried by said support means and turnably carrying said second roller, said pair of adjusting means each having an outer surface formed with an elongated groove, and a pair of screw members threadedly carried by said support means and having head ends respectively extending into said grooves so that turning of said screw members results in shifting of said bearing means to adjust the inclination of the axis of said second roller.

4. Pressure roller apparatus comprising, in combination, support means; a first cylindrical roller mounted for rotation about its axis on said support means; a second cylindrical roller also mounted for rotation about its axis on said support means and having one half of its axis located on one side of said axis of said first roller and the other half of its axis located on the opposite side of said axis of said first roller; yieldable pressing means operatively connected to opposite ends of said second roller for pressing the same toward said first roller, said second roller having an initial bend of slight magnitude about said first roller, said pressing means causing said second roller to have said bend about said first roller and providing contact between said first and second rollers along the entire length of at least one of said rollers and along a line forming part of a helix; and a scraper operatively connected to said second roller for scraping the same.

5. Pressure roller apparatus comprising, in combination, support means; a first cylindrical roller mounted for rotation about its axis on said support means; a second cylindrical roller also mounted for rotation about its axis on said support means and having one half of its axis located on one side of said axis of said first roller and the other half of its axis located on the opposite side of said axis of said first roller; yieldable pressing means operatively connected to opposite ends of said second roller for pressing the same toward said first roller, said second roller having an initial bend of slight magnitude about said first roller, said pressing means causing said second roller to have said bend about said first roller and providing contact between said first and second rollers along the entire length of at least one of said rollers and along a line forming part of a helix; a scraper operatively connected to said second roller for scraping the same; first adjusting means operatively connected to said second roller for adjusting the inclination thereof with respect to said first roller; and second adjusting means operatively connected to said scraper for aligning the same with said second roller.

6. Pressure roller apparatus comprising, in combination, support means; a first cylindrical roller mounted for rotation about its axis on said support means; a second cylindrical roller also mounted for rotation about its axis on said support means, having intermediate its ends a central outer surface portion contacting said first roller, and having one half of its axis located on one side of said axis of said first roller and the other half of its axis located on the opposite side of said axis of said first roller; yieldable pressing means operatively connected to opposite ends of said second roller for pressing the same toward said first roller; a scraper operatively connected to said second roller for scraping the same; first adjusting means operatively connected to said second roller for adjusting the inclination thereof with respect to said first roller; and second adjusting means operatively connected to said scraper for aligning the same with said second roller, said second adjusting means being in the form of a pair of members eccentrically and turnably mounted on said support means and respectively being pivotally connected to opposite ends of said scraper.

7. Pressure roller apparatus comprising, in combination, support means; first bearing means fixed to said support means; a lower roller turnably supported for rotation about its axis by said first bearing means; second bearing means mounted on said support means over said first bearing means for vertical movement toward and away from the latter; an upper roller turnably supported for rotation about its axis by said second bearing means and having one half of its axis located on one side of said axis of said lower roller and the other half of its axis located on the opposite side of said axis of said lower roller; adjusting means operatively connected to said upper roller for adjusting the inclination of said axis thereof with respect to said axis of said lower roller; and fluid pressing means operatively connected to opposite ends of said upper roller to urge the same downwardly toward said lower roller, said upper roller having an initial bend of slight magnitude about said lower roller, said pressing means causing said upper roller to have said bend about said lower roller and providing contact between said upper and lower rollers along the entire length of at least one of said rollers and along a line forming part of a helix.

References Cited in the file of this patent

UNITED STATES PATENTS

| | | |
|---|---|---|
| 134,131 | Dummer | Dec. 24, 1872 |
| 316,232 | Brown | Apr. 21, 1885 |
| 320,977 | Shorey | June 30, 1885 |
| 999,635 | Dunn | Aug. 1, 1911 |
| 1,004,771 | Gibbons | Oct. 3, 1911 |
| 1,113,189 | Bradford | Oct. 13, 1914 |
| 1,755,278 | Strain | Apr. 22, 1930 |
| 1,890,287 | Givens | Dec. 6, 1932 |
| 1,901,080 | Bradner | Mar. 14, 1933 |
| 2,107,541 | Long | Feb. 8, 1938 |
| 2,334,886 | Siegerist | Nov. 23, 1943 |
| 2,369,598 | Misset | Feb. 13, 1945 |
| 2,592,985 | Walrafen | Apr. 15, 1952 |

FOREIGN PATENTS

| | | |
|---|---|---|
| 177,241 | Germany | Oct. 30, 1906 |